United States Patent [19]

Fiala

[11] 4,327,577
[45] May 4, 1982

[54] EFFICIENCY METER FOR A VEHICLE ENGINE

[75] Inventor: Ernst Fiala, Wolfsburg, Fed. Rep. of Germany

[73] Assignee: Volkswagenwerk Aktiengesellschaft, Wolfsburg, Fed. Rep. of Germany

[21] Appl. No.: 161,026

[22] Filed: Jun. 19, 1980

[30] Foreign Application Priority Data

Jun. 28, 1979 [DE] Fed. Rep. of Germany ....... 2926023

[51] Int. Cl.³ .............................................. G01L 23/24
[52] U.S. Cl. ..................................................... 73/115
[58] Field of Search .......................... 73/115, 114, 116

[56] References Cited

U.S. PATENT DOCUMENTS 3,916,682 11/1975 Garcea ................................... 73/114
4,173,887 11/1979 Fiala ...................................... 73/114

Primary Examiner—Jerry W. Myracle
Attorney, Agent, or Firm—Brumbaugh, Graves, Donohue & Raymond

[57] ABSTRACT

An indicating instrument for displaying the operating efficiency of a motor vehicle having an automatic transmission, which includes a pointer movable across an instrument face, and which is operable only when the engine speed is above idle and the transmission is in drive gear.

3 Claims, 1 Drawing Figure

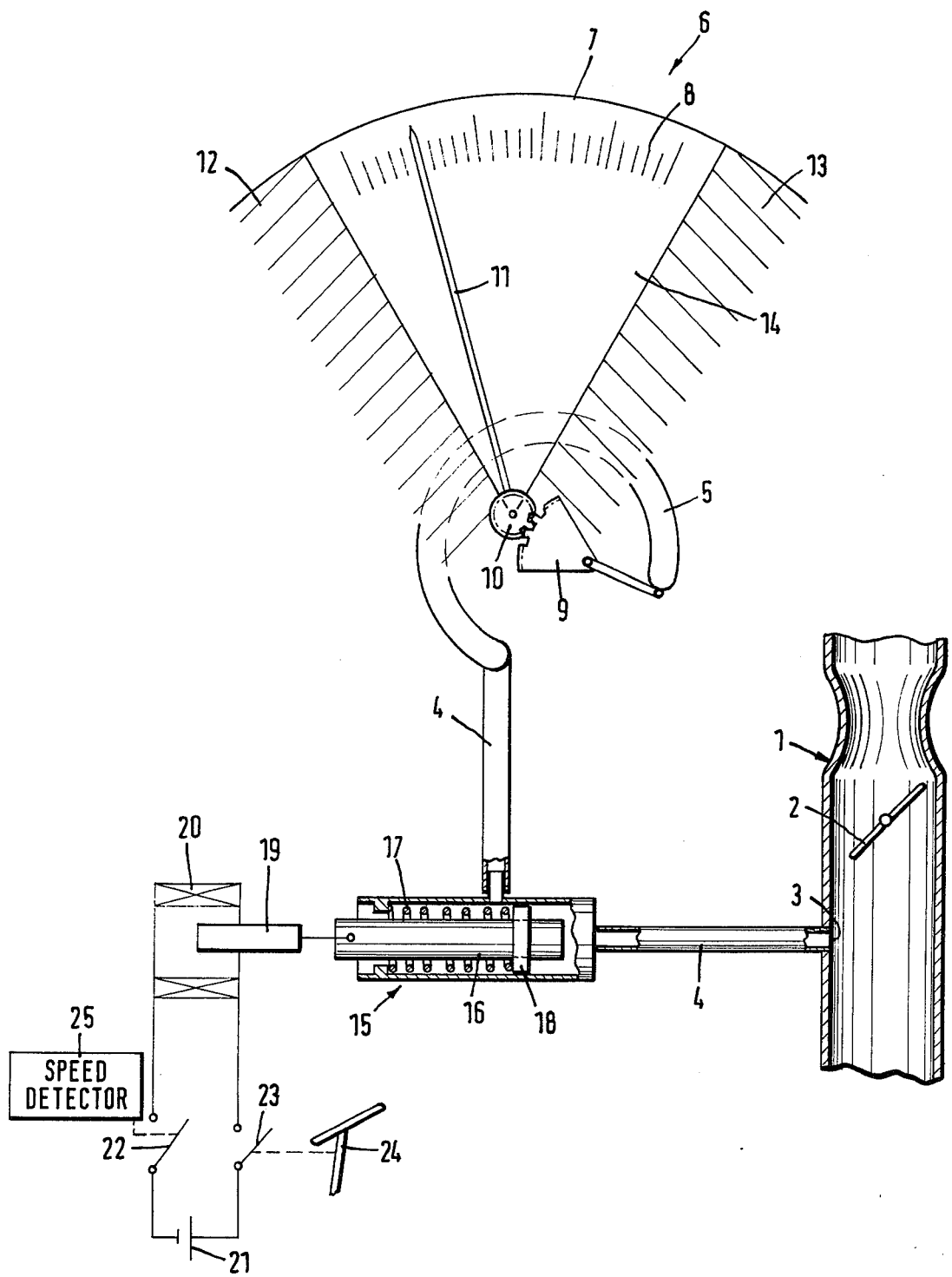

EFFICIENCY METER FOR A VEHICLE ENGINE

BACKGROUND OF THE INVENTION

This invention relates to an indicator instrument for displaying the operating efficiency of a motor vehicle and more particularly it concerns an indicator instrument for a motor vehicle having an automatic transmission.

This application is related to my copending U.S. application Ser. No. 18,716, filed Mar. 8, 1979, now U.S. Pat. No. 4,223,553 in which an efficiency meter for an internal combustion engine equipped with a manually operated transmission is described. An essential aspect of the prior device is the generation of an indication only when the highest gear is engaged. Moreover, the arrangement described in the earlier patent application provides for an indicator instrument with opaque portions for the indicator positions corresponding to idling, engine-braking, and full load acceleration. Thus, the driver receives an efficiency indication only in a limited range of vehicle operation, namely, at cruising speed, which is the operating range occurring most frequently. When in the cruising range, it is important that the driver be provided with easily viewable information on engine efficiency, which will not detract his attention from the highway.

SUMMARY OF THE INVENTION

It is the purpose of the invention to provide an arrangement for displaying engine operating efficiency which is compatible with an automatic transmission and which ensures that the driver of a vehicle with an automatic transmission is provided with easily viewable information on fuel consumption per unit distance traveled during the most relevant operating state of the engine, i.e., during the manner of operation occurring most frequently.

Thus, the preferred embodiment of the indicator in accordance with the invention provides a fuel consumption indication only when both the selector lever of the automatic transmission is in the drive position and a defined engine speed, e.g. 2000 rpm, has been attained.

The apparatus of the invention is an alternative to detecting the engagement of the highest gear of an automatic transmission by means of a sensor and utilizing the resulting signal for connecting a line between the vacuum intake and the indicator operating mechanism. Interferences of this kind with the transmission proper are preferably avoided for various technical reasons.

For a better understanding of the present invention, together with other and further objects, reference is made to the following description, taken in conjunction with the accompanying drawing, and its scope will be pointed out in the appended claims.

BRIEF DESCRIPTION OF THE DRAWING

The drawing illustrates a preferred embodiment of the invention by way of example.

DESCRIPTION OF THE INVENTION

The drawing shows the intake pipe 1 of an internal combustion engine which includes a throttle 2 for controlling operation of the engine. Below the throttle 2 in the direction of flow, there is provided a connecting line 4 which picks up the negative pressure of the intake passage at point 3, for use in a manometric indication of fuel consumption in the Bourdon tube 5 of instrument 6. Instrument 6 is provided with a graduated face 7 having a scale 8 calibrated in fuel consumption per 100 kilometers, or fuel consumption in miles per gallon. A pointer 11 is coupled to Bourdon tube 5 in the conventional way by means of gear 9 and pinion 10.

In front of the face 7 of meter 6 there are provided opaque screen portions 12 and 13, and transparent window 14 which extends over only that portion of the sweep of pointer 11 which corresponds to cruising operation of the vehicle. Oscillations of pointer 11 in idling or deceleration of the vehicle are made invisible by opaque portion 12 of the screen, and oscillations of pointer 11 during abrupt acceleration of the vehicle are made invisible by opaque portion 13 of the screen.

A spring-biased switch means 15 is situated in the connecting line 4 between the intake 1 and the Bourdon tube 5. When the piston 16 is in its rest position, as shown in the drawing, the Bourdon tube 5 is connected to the atmosphere, so that the indicator 11 is outside the window 14. However, if the switching device 15 is actuated, the piston 16 is pulled outwardly in opposition to the force of the compression spring 17 so that the control edge 18 is placed to the left of the opening of the upper portion of the connecting line 4, effectively joining both portions of the connecting line 4.

The switching means 15 is provided with a core 19 and an associated excitation winding 20 in an excitation circuit which, in addition to a battery 21, contains two contacts, 22 and 23, which are connected in series and thus form an AND network. The first contact 22 closes as a function of the speed of the internal combustion engine as sensed by detector 25 and it is adjusted to close at a speed just above the speed which occurs during idling, e.g. at 2000 rpm. The second contact 23 is connected with the selector lever 24 of the automatic transmission in such a manner that it closes when the lever 24 has been moved to the drive position.

While there has been described what is believed to be the preferred embodiment of the invention, those skilled in the art will recognize that other and further modifications may be made thereto without departing from the spirit of the invention, and it is intended to claim all such embodiments as fall within the true scope of the invention.

I claim:

1. An instrument of displaying an indication of the operating efficiency of a motor vehicle engine coupled to an automatic transmission, said transmission having a selector lever, comprising an indicator having an operating mechanism actuated by the engine intake vacuum pressure and a switch means positioned in a connecting line between said operating mechanism and the vehicle engine intake passage, wherein said switch means connects said operating mechanism to said intake passage only when said selector lever is in the drive position and the engine is operating at a speed above idling speed and corresponding to engagement under normal operating conditions of the highest gear of said automatic transmission.

2. An instrument as specified in claim 1 wherein said switch means includes an electromagnetic excitation actuator comprising an AND network of contacts which close as a function of engine speed and as a function of the position of said transmission selector lever, respectively.

3. An instrument as specified in claim 1 or 2 wherein said instrument has a pointer movable across an instrument face and is provided with opaque portions that conceal indications at idling and at full acceleration.

* * * * *